(12) United States Patent
Annaka (10) Patent No.: US 8,638,201 B2
(45) Date of Patent: Jan. 28, 2014

(54) WILDLIFE DISLODGING DEVICE

(75) Inventor: Hiroshi Annaka, Takasaki (JP)

(73) Assignees: Hiroshi Annaka, Takasaki-shi, Gunma (JP); Keizo Okamoto, Tokyo (JP)

( * ) Notice: Subject to any disclaimer, the term of this patent is extended or adjusted under 35 U.S.C. 154(b) by 851 days.

(21) Appl. No.: 12/813,899

(22) Filed: Jun. 11, 2010

(65) Prior Publication Data

US 2010/0245059 A1 Sep. 30, 2010

Related U.S. Application Data

(63) Continuation of application No. PCT/JP2008/072645, filed on Dec. 12, 2008.

(30) Foreign Application Priority Data

Dec. 13, 2007 (JP) ................................. 2007-321786
Sep. 22, 2008 (JP) ................................. 2008-242452

(51) Int. Cl.
*G08B 3/10* (2006.01)
(52) U.S. Cl.
USPC .................... 340/384.2; 340/384.1; 340/384.3
(58) Field of Classification Search
USPC .......................................... 340/384.2–384.72
See application file for complete search history.

(56) References Cited

U.S. PATENT DOCUMENTS 4,001,817 A 1/1977 Squires
2006/0139152 A1* 6/2006 Keeler et al. ............... 340/384.6

FOREIGN PATENT DOCUMENTS

| JP | 51-69067 | 6/1976 |
| JP | 56-45152 | 4/1981 |
| JP | 59-169436 | 9/1984 |
| JP | 10-136865 | 5/1998 |
| JP | 2003-304797 A1 | 10/2003 |

OTHER PUBLICATIONS

International Search Report for International Application No. PCT/JP2008/072645 dated Mar. 4, 2009.

* cited by examiner

*Primary Examiner* — Hai Phan
*Assistant Examiner* — Ojiako Nwugo
(74) *Attorney, Agent, or Firm* — Kratz, Quintos & Hanson, LLP (57) ABSTRACT

The wildlife dislodging device outputs sound signal while a frequency is changed to a different frequency stepwise, and suddenly outputs a sound signal pulse of a high frequency in changing the frequency.

9 Claims, 8 Drawing Sheets

| OUTPUT PULSE NUMBER OF SECOND OSCILLATING CIRCUIT 12 | DESIGNATED VALUE (INTEGRAL VALUE AFTER ROUNDING OFF) | OUTPUT FREQUENCY (kHz) |
|---|---|---|
| 0 | 50 | 10 |
| 1 | ⋮ | ⋮ |
| 2 | ⋮ | ⋮ |
| ⋮ | ⋮ | ⋮ |
| n | $\dfrac{500}{\dfrac{(50-10)}{200} \times n + 10}$ | $\dfrac{(50-10)}{200} \times n + 10$ |
| ⋮ | ⋮ | ⋮ |
| 200 | 10 | 50 |

WILDLIFE DISLODGING DEVICE

CROSS-REFERENCE TO RELATED APPLICATIONS

This application is a continuation of prior International Patent Application No. PCT/JP2008/072645, filed Dec. 12, 2008, the entire contents of which are incorporated herein by reference.

BACKGROUND OF THE INVENTION

1. Field of the Invention

The present invention relates to a wildlife dislodging device that dislodges wild birds and animals.

2. Description of the Related Art

Newspaper and television have reported that wild birds such as crows and wild animals such as monkeys and boars caused severe damage to crops of fields and farms.

Recently, an incident is not rare that bears, monkeys, boars and so on appear in residential areas to endanger human lives.

Further, damage has also been reported that the number of deer increased too much and they ate up precious plants in mountains and forests.

So, in order to prevent such damages, wildlife dislodging devices by various methods have been suggested.

As one of the methods, a device that dislodges birds and animals by changing of sounds is suggested in Patent Documents (Japanese Patent Laid-open No. Sho51-69067 and Japanese Patent Laid-open No. 2003-304797).

However, conventionally, in the case of using the suggested wildlife dislodging devices, even if birds and animals can be temporarily driven out, it seems to be impossible for the devices to continuously dislodge birds and animals.

SUMMARY OF THE INVENTION

In view of such problems, the present inventors had manufactured devices on an experimental basis, and repeated many tests for several years while visiting places where boars frequently appeared, monkeys ruined farmland, and crows ate up crops. Then, an object of the present invention is to provide a wildlife dislodging device that was finally created on the basis of the test.

According to the wildlife dislodging device, the device is characterized by including a first oscillating circuit, a counter that counts pulse number of an output signal of the first oscillating circuit, a designated value-generating circuit that designates values to be counted by the counter, a second oscillating circuit that changes the designated value of the designated value-generating circuit at an interval of predetermined time, a comparator circuit that compares the count value of the counter with the designated value of the designated value-generating circuit, outputs a pulse signal and resets the counter when the count value reaches the designated value, an output circuit that amplifies the pulse signal of the comparator circuit, sound transforming means for transforming the pulse signal of the output circuit into sound, a delay circuit that delays time of transmitting the designated value of the designated value-generating circuit to the comparator circuit, and an initial value-changing circuit that changes an initial value of the counter during the delay time.

According to the wildlife dislodging device, it outputs the sound of a pulse signal in which particular frequency is changed stepwise and suddenly outputs the sound of frequency different from the frequency, for example, high-frequency pulse.

Experiments brought an effect that birds and animals which heard such sound waves were frightened and could not come again near a region where the sound waves can be heard.

According to the wildlife dislodging device of the present invention, damage of crops can be prevented by installing it in farmland, orchard and forest.

Further, if the device is installed in an airport, birds can be driven out, so that an airplane accident caused by taking birds into an engine can be also prevented.

DESCRIPTION OF THE PREFERRED EMBODIMENT

In the following, the embodiment of the present invention will be explained referring to FIG. 1 to FIG. 8.

Figure 1:
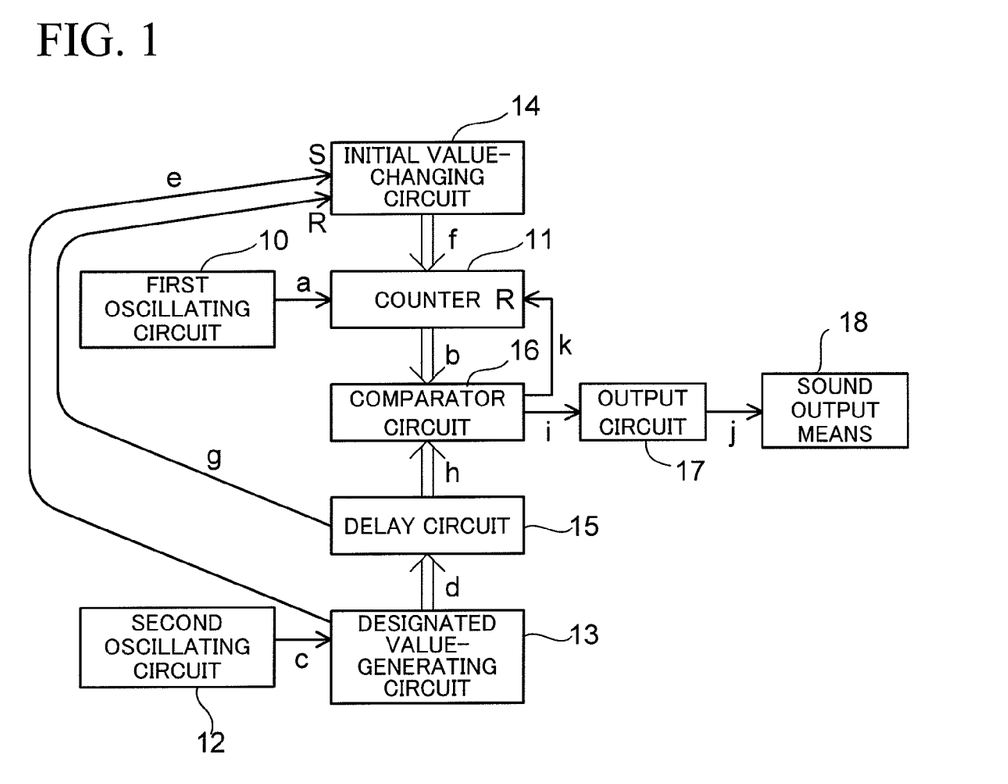
FIG. 1 is a view illustrating the block structure of a wildlife dislodging device according to an embodiment of the present invention.

FIG. 1 is the block diagram illustrating the entire constitution of the wildlife dislodging device according to the embodiment.

(1) EXPLANATION OF BASIC SOUND OUTPUT IN WHICH FREQUENCIES CHANGE STEPWISE

Figure 3:
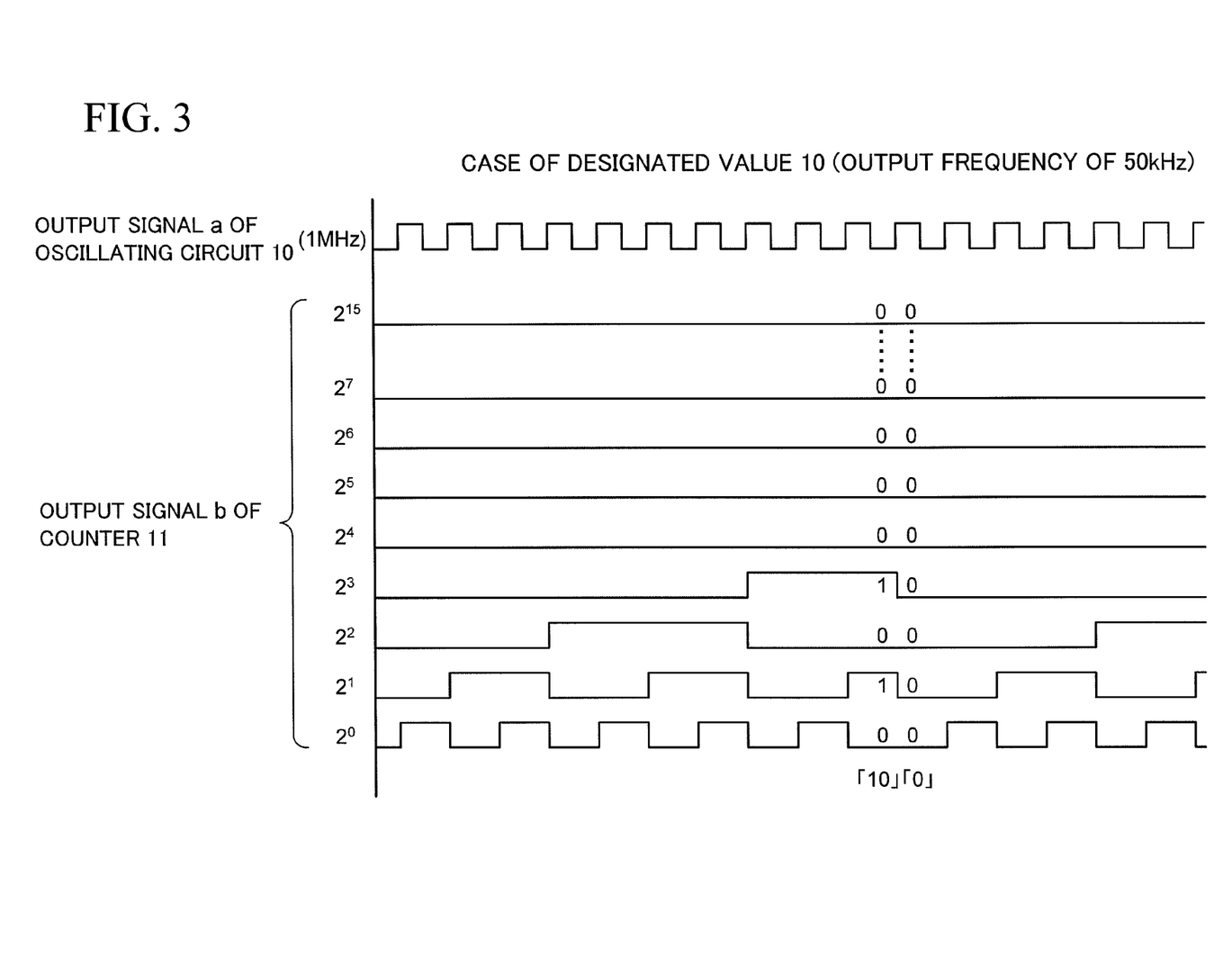
FIG. 3 is a timing chart between a pulse signal a of a first oscillating circuit 10 and a pulse signal b outputted from a counter 11.

As illustrated in FIG. 1 and FIG. 3, a 1 MHz clock pulse signal a is outputted from the first oscillating circuit 10. The counter 11 counts a clock pulse of the first oscillating circuit 10 and outputs the counted count value b in a 16-bit expression. The count value b is inputted to one input of the comparator circuit 16.

Figure 4:
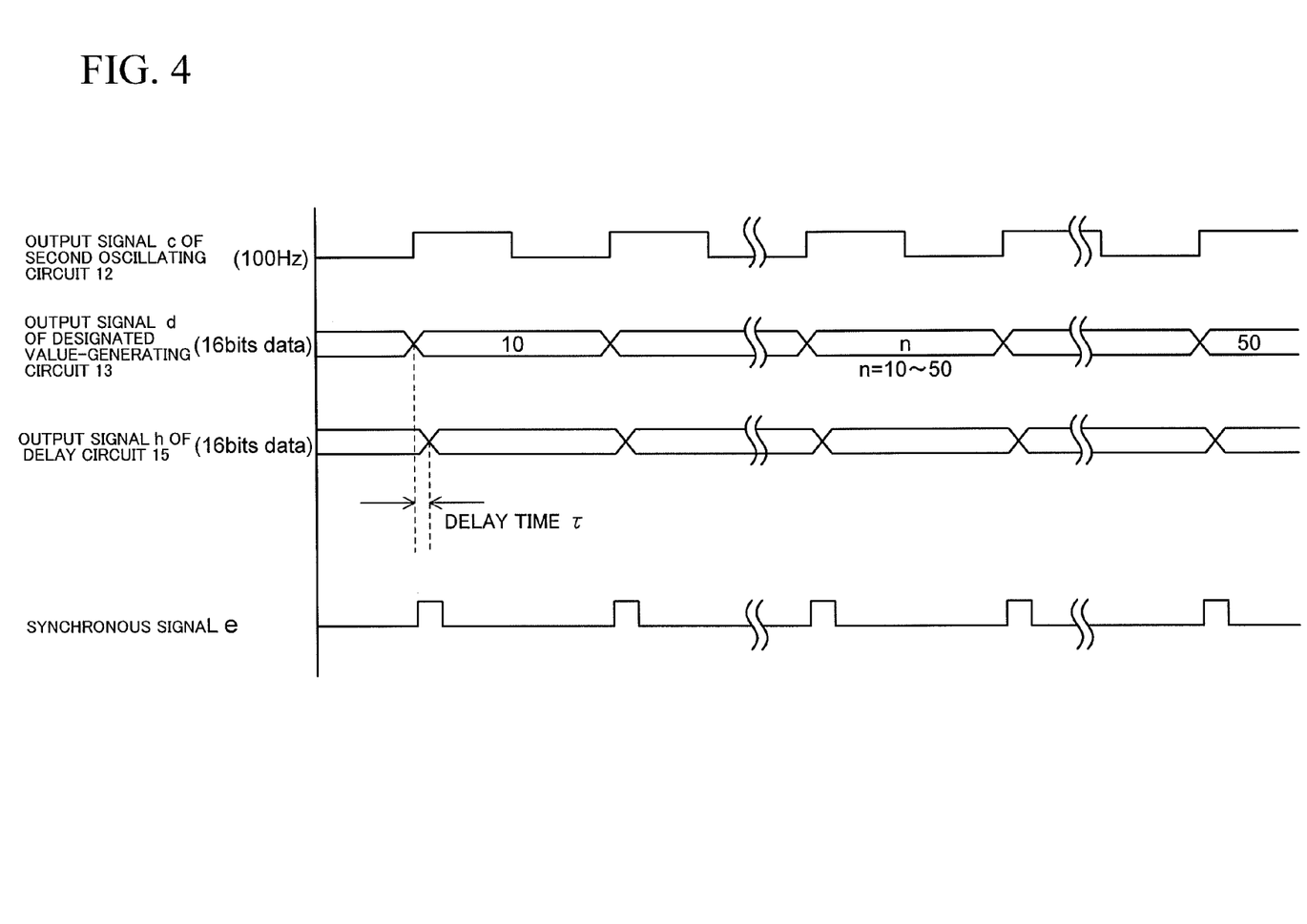
FIG. 4 is a timing chart among a pulse signal c of the second oscillating circuit 12, a designated value d (16-bit expression) of the designated value-generating circuit 13, a designated value h (16-bit expression) of a delay circuit 15, and a synchronous signal e.

On the other hand, the clock pulse signal c of 100 Hz is outputted from the second oscillating circuit 12 and inputted to the designated value-generating circuit 13 as illustrated in FIG. 1 and FIG. 4. At an interval of time when the designated value-generating circuit 13 inputs one pulse outputted from the second oscillating circuit 12, it performs computation based on the equation shown in FIG. 2 and outputs the designated value d. In the case where a computation result includes decimal point, the computation result is replaced by an integer through rounding off number below the decimal point.

Figure 2:
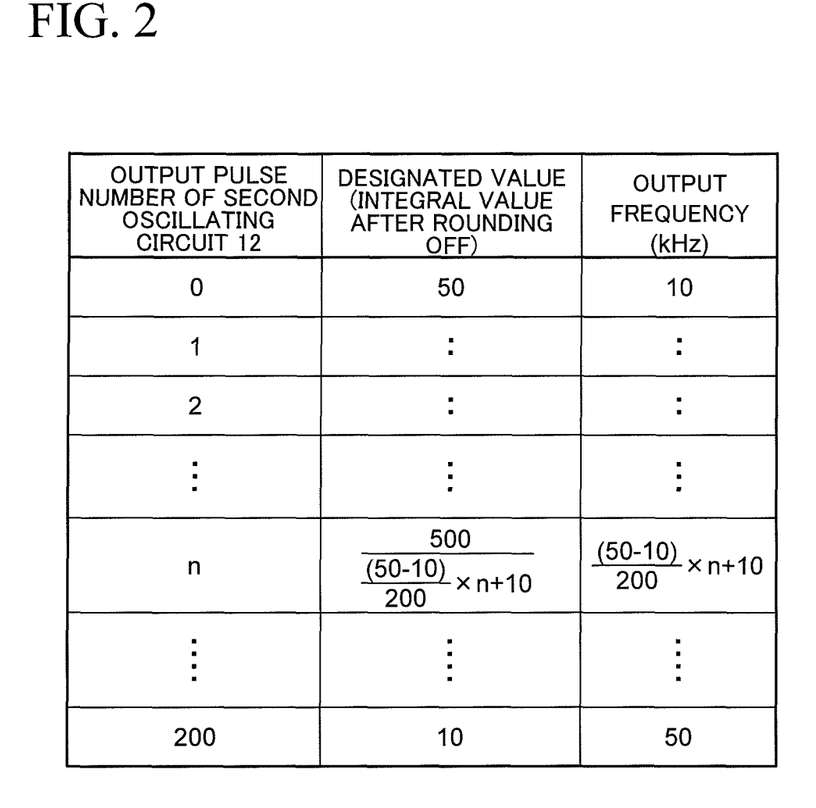
FIG. 2 is a view illustrating relation among output pulses of a second oscillating circuit 12, designated values of a designated value-generating circuit 13, and frequencies of a pulse signal of an output circuit 17.

As illustrated in FIG. 2, the designated value d is "50" before inputting pulse. The designated value d is determined by the number of input pulses, and the designated value d is "10" when a 200th pulse is inputted.

The designated value d generated in the designated value-generating circuit 13 is temporarily inputted to the delay circuit 15. A designated value h is inputted to the other input of the comparator circuit 16 after a delay of a fixed time τ.

In the comparator circuit 16, an integral designated value h outputted from the delay circuit 15 is sequentially compared with the count value b outputted from the counter 11.

Figure 5:
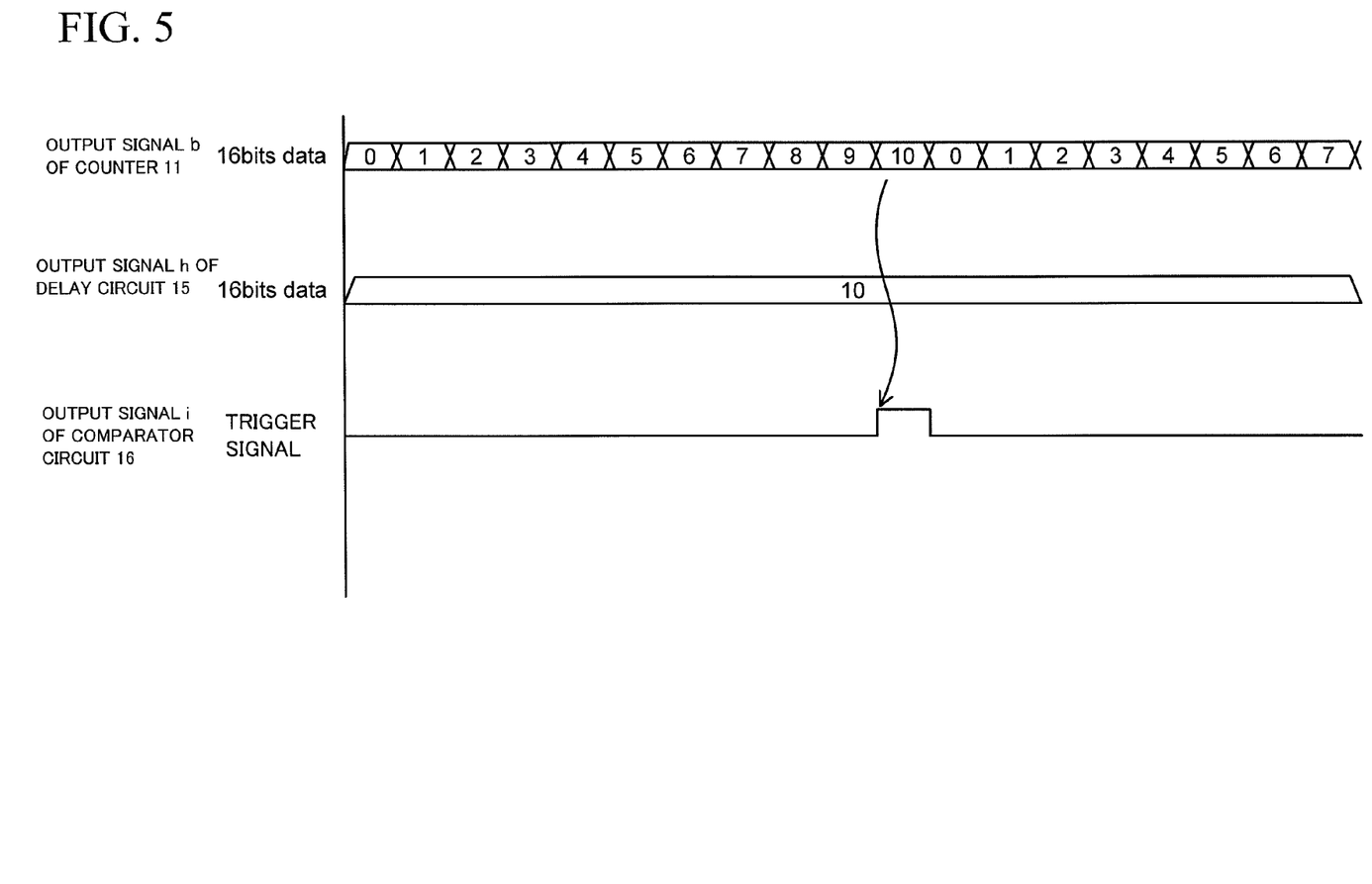
FIG. 5 is a timing chart among a count value (16-bit expression) of the counter 11, the designated value h (16-bit expression) of the delay circuit 15, and pulse signal outputted from a comparator circuit 16.
Figure 6:
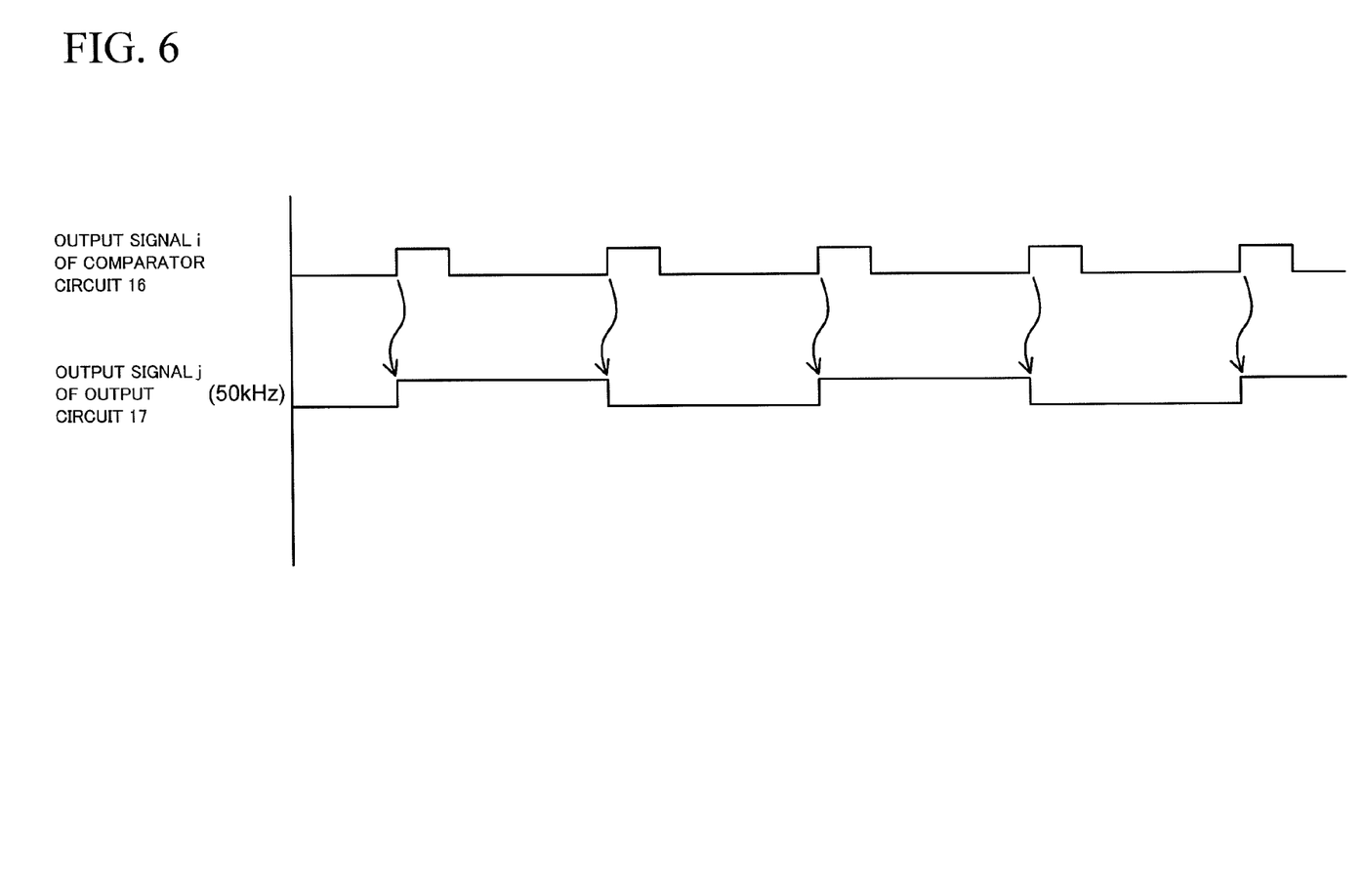
FIG. 6 is a timing chart of pulse signal i outputted from the comparator circuit 16 and pulse signal j outputted from the output circuit 17.

When the count value b reaches the designated value h and the values become equal to each other, a match signal i is outputted from the comparator circuit 16 as illustrated in FIG. 5. Then, when the match signal i is inputted to the output circuit 17, the match signal i works as a trigger signal of the output circuit 17 as illustrated in FIG. 6. Thus, an output level of an output j from the output circuit 17 is inverted each time when the match signal i is inputted.

Further, when the match signal i is outputted from the comparator circuit 16, in synchronization with this, a reset signal k is inputted to a reset input of the counter 11 to reset the counter 11.

(A) In the Case where the Designated Value d is "50"

Assuming that the designated value is "50", the counter 11 is reset each time when it counts 50 of 1 MHz clock pulses outputted from the oscillating circuit 10, and a 20 kHz match signal i is outputted from the comparator circuit 16. With this, a 10 kHz pulse is outputted from the output circuit 17, and thus, sound corresponding to the 10 kHz pulse is outputted from sound output means (a speaker for example) 18.

(B) In the Case where the Designated Value d is "10"

Assuming that the designated value d is "10", the counter 11 is reset each time when it counts 10 of 1 MHz clock pulses outputted from the oscillating circuit 10, and a 100 kHz match signal i is outputted from the comparator circuit 16. With this, the 50 kHz pulse is outputted from the output circuit 17, and thus, sound corresponding to the 50 KHz pulse is outputted from the sound output means 18.

Generally speaking, when n pieces of 100 Hz pulse signals from the oscillating circuit 12 are inputted to the designated value-generating circuit 13, the designated value d outputted from the designated value-generating circuit 13 is computed by the general expression of FIG. 2, and a sound with a frequency according to the designated value d is sequentially outputted from the sound output means 18.

Note that the operational expression illustrated in FIG. 2 is one embodiment, and an operational expression is variously changeable. Further, though frequencies are increased from 10 kHz to 50 kHz in this embodiment, it is also possible to decrease frequencies from 50 kHz to 10 kHz. Further, instead of monotonous increasing or decreasing, it is also possible to appropriately mix increasing and decreasing. Further, it is also possible to change the maximum frequency 50 kHz or the minimum frequency 10 kHz to different frequency.

(2) EXPLANATION OF A SOUND OUTPUT IN WHICH A FREQUENCY SUDDENLY CHANGES TO A HIGH FREQUENCY

Next, explanation will be made for outputting a high frequency pulse signal in synchronization with changing of the designated value d outputted from the designated value-generating circuit 13, that is, changing of a value of a sound frequency outputted from the sound output means 18.

Figure 7:
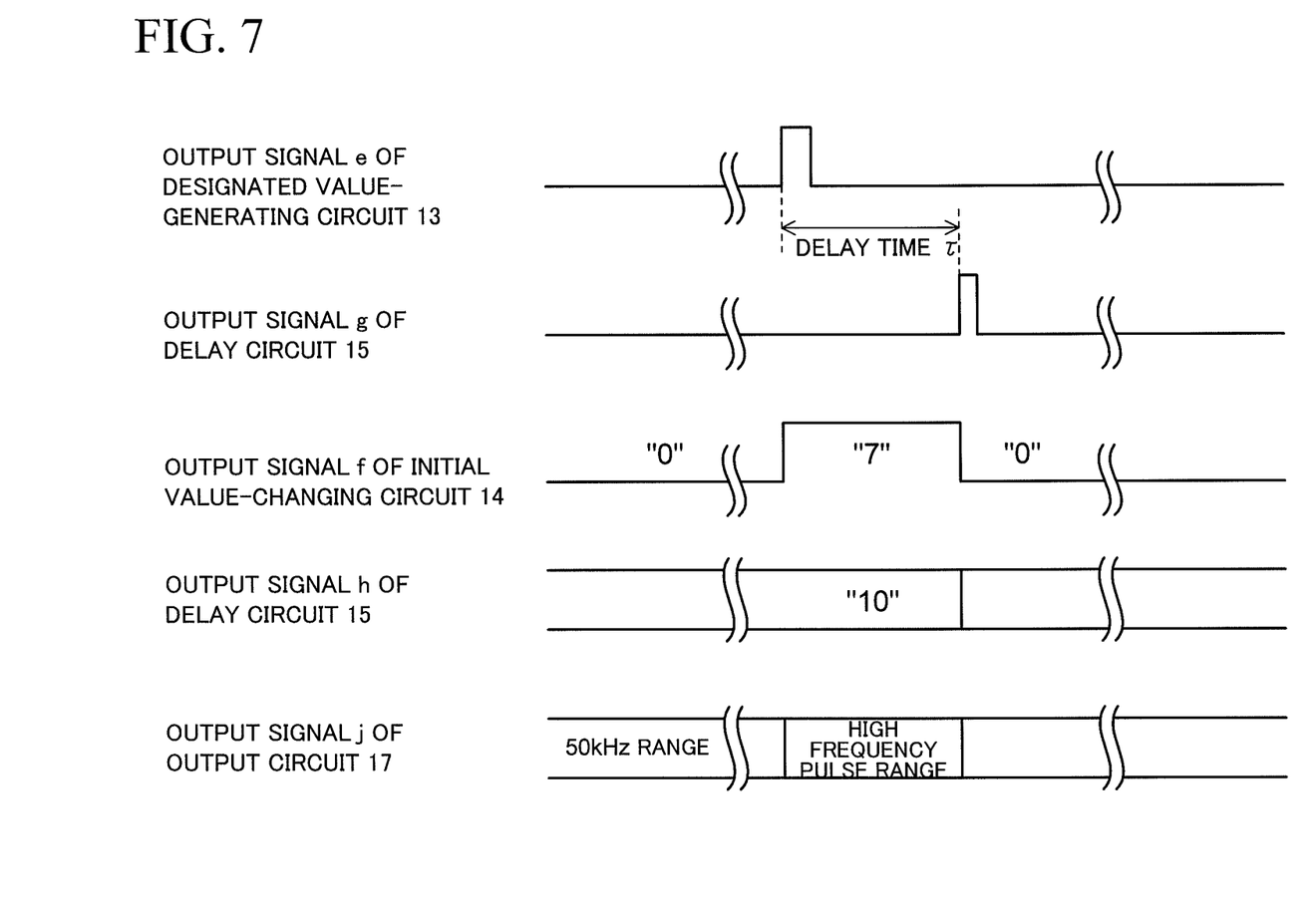
FIG. 7 is a timing chart between an output signal e of the designated value-generating circuit 13, an output signal g of the delay circuit 15, an output (16-bit expression) of an initial value-changing circuit 14, an output (16-bit expression) of the delay circuit 15, and a frequency range of pulse signal j outputted from the output circuit 17.

As shown in FIG. 1, FIG. 4 and FIG. 7, when the designated value d is outputted from the designated value-generating circuit 13 to the delay circuit 15, in synchronization with this, a set signal e is outputted from the designated value-generating circuit 13 to the initial value-changing circuit 14. The initial value-changing circuit 14 changes an initial value of the counter 11 based on the set signal e.

With this, the counter 11 starts a counting action from the changed initial value, and thus, more match signals are outputted from the comparator circuit 16. This results in a high frequency sound.

The initial value-changing circuit 14 is reset by an output signal g of the delay circuit 15. The output signal g is outputted in synchronization with a time when the designated value h is outputted from the delay circuit 15. Therefore, the high frequency sound is outputted from the sound output means 18 during a time determined by a delay time τ of the delay circuit 15.

For example, now, it is assumed that the designated value h inputted to the comparator circuit 16 is "10". In this state, it is assumed that the set signal e is inputted from the designated value-generating circuit 13 to the initial value-changing circuit 14, and the initial value of the counter 11 is changed from "0" to "7".

This leads to a start from "7" in a counting action of the counter 11 though till then the counting action has been a start from an initial value "0". In other words, the counter 11 counts only three pulses from "7" to "10" and then the match signal is outputted from the comparator circuit 16. As a result, the output circuit 17 outputs a high frequency pulse signal. Consequently, the high frequency pulse signal is outputted during the delay time τ.

Since the reset signal g is inputted from the delay circuit 15 to the initial value-changing circuit 14 after the delay time τ passes, the initial value of the counter 11 is returned to "0". Then again, the output circuit 17 outputs pulse having frequency determined by the designated value h instead of the high frequency pulse signal.

As described above, according to the embodiment of the present invention, pulse signal is outputted while a frequency is changed to a different frequency stepwise, and signal pulse of a high frequency can be suddenly outputted in changing the frequency.

Note that the delay time τ and the initial value f are changeable appropriately.

Figure 8:
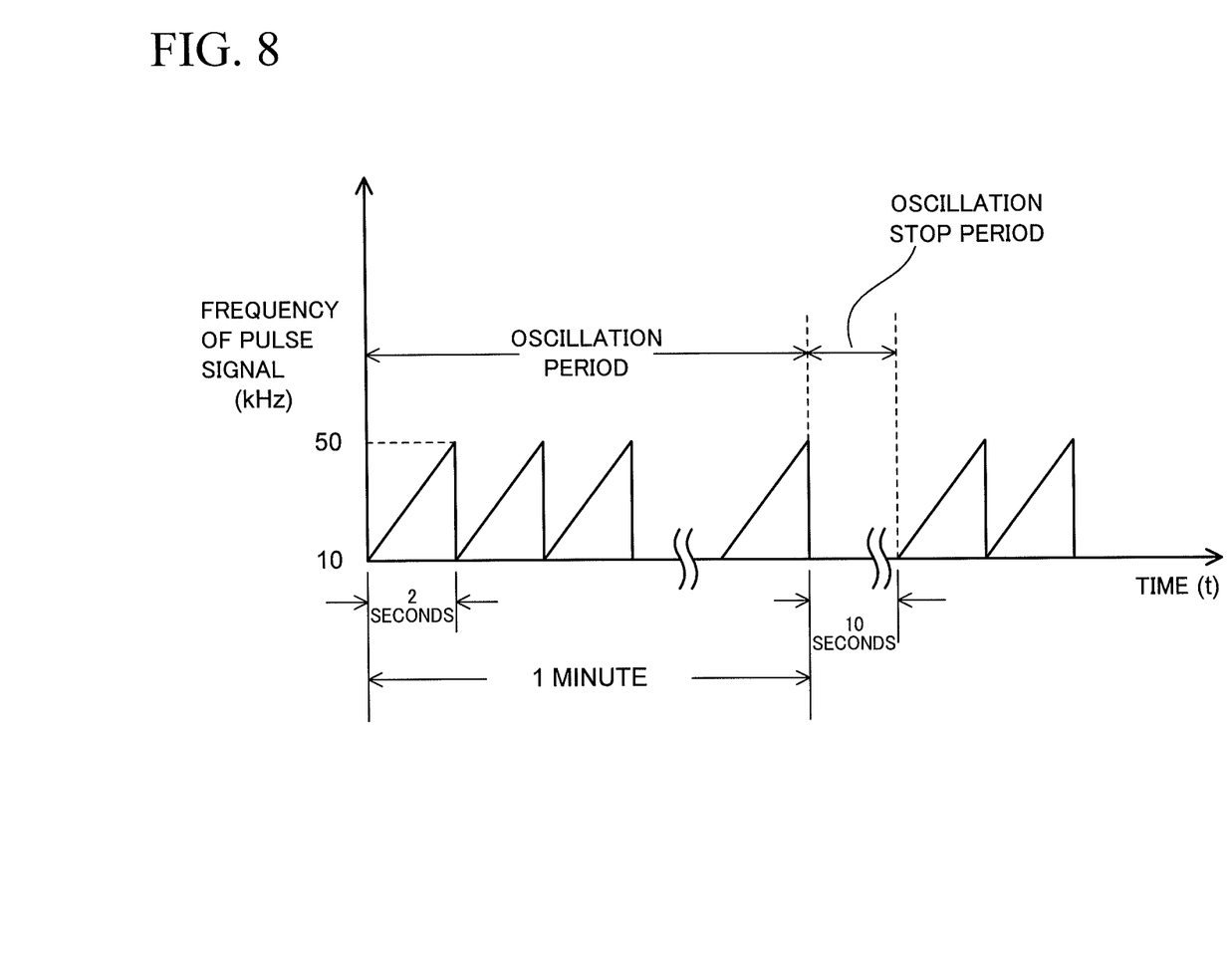
FIG. 8 is a view illustrating the state of frequency change of the pulse signal j outputted from the output circuit 17 in case that oscillation is stopped for fixed time after repeating frequency changes rising from 10 kHz to 50 kHz.

FIG. 8 is the view illustrating the state of a pulse signal outputted from the output circuit 17, in which frequencies are changed stepwise from 10 kHz to 50 kHz in 2 seconds, followed by repeating such changing for 30 times, and then output is stopped for 10 seconds.

The reason why the oscillation stop time is provided is due to the following experiment fact. That is, an animal fled after hearing weird sound, followed by stopping once to see what was going on, and then, at the time of hearing sound again, it ran for their life.

Note that oscillation time and oscillation stop time can be appropriately changed depending on a use state.

As described above, according to the embodiment, a sound signal of a high frequency is suddenly created in synchronization with changing frequency. With this, birds and animals hear or feel unexpected and weird sound, which results in increased dislodging effect to birds and animals. According to experiments, birds and animals which heard the sound waves of this embodiment seem to be frightened, and those that heard the sound do not seem to come again near a region of hearing sound.

(3) EXPERIMENT EXAMPLES

Experiments using the wildlife dislodging device of this embodiment were conducted in general farmland, orchard and fish farm. Note that the employed speaker was a general audio purpose speaker commercially available with the characteristics of a playback sound pressure level of 98 dB/W (1 m) and a playback frequency band of 5 kHz to 50 kHz.

Table 1 contains major experiment results. The table indicates that the wildlife dislodging device of this embodiment is effective not only against monkeys and boars, but also against fowl such as crows and herons.

TABLE 1

| Experiment | Installed Place | Installed Period | Effect to Wildlife | | | | |
|---|---|---|---|---|---|---|---|
| | | | Monkey | Bear | Crow | Deer | Gray heron etc. |
| 1 | General Farmland | One month from early July of 2007 | ◎ | — | ○ | — | — |
| 2 | Orchard | Continuously used from early July of 2007 | ○ | ◎ | ○ | — | — |
| 3 | General Farmland | Used as needed from early July of 2007 | ◎ | — | ◎ | — | — |
| 4 | General Farmland | Continuously used from early June of 2007 | ◎ | ◎ | ◎ | ◎ | — |
| 5 | General Farmland | Continuously used from end of August of 2007 | ◎ | — | — | — | — |
| 6 | General Farmland | One month from early August of 2007 | ○ | — | — | — | — |
| 7 | Orchard | Continuously used from August of 2007 | ◎ | ◎ | ◎ | — | — |
| 8 | General Farmland | Two months from early August to end of October of 2007 | (○) | — | ◎ | — | — |
| 9 | Orchard | Continuously used from early October of 2007 | ○ | — | — | — | — |
| 10 | Fish farm | Continuously used from early October of 2007 | — | — | — | — | ◎ |

Marks of (○) express that it was unclear whether or not damages were caused by monkeys though there were small-scale damages.

Experiment 1

(I) Installed place Fukushima prefecture Minamiaizu machi Koshio area General farmland (II) Installed period One month from early July of 2007

(III) Installation effect

Before installing this device, a troop of monkeys appeared in the farmland about once a week and caused damage. After installing the device, no damage was caused. Little damage was caused also by crows similar to the case of monkeys.

Experiment 2

(I) Installed place Fukushima prefecture Minamiaizu machi Nakaarai area Orchard (II) Installed period Continuously used from early July of 2007

(III) Installation effect

Note that this orchard uses an explosion machine and an electric fence against bears in combination. Before installing this device, a troop of monkeys came over the fence many times to cause damage, but after installing the device, little damage is suffered. The animals still appear frequently in areas about 10 m higher to mountain side, which are a little far from the installed place, and farmland 200 m below, which suffer damage. Currently, the device is used at night as well, so bears do not seem to come near the orchard. Further, damage caused by fowl such as crows is also small, and there is no worry any more even if no one watches the farmland.

Experiment 3

(I) Installed place Fukushima prefecture Minamiaizu-gun Haneshio area General farmland (II) Installed period Used as needed from early July of 2007

(III) Installation effect

Before installing this device, a troop of monkeys came once a month to cause damage, but no damage has been suffered since the device was installed. They seem to come to woods about 200 m ahead, but do not even try to come near the farmland. Further, crows that had come to a compost yard never appeared.

Experiment 4

(I) Installed place Fukushima prefecture Minamiaizu-gun Itozawa area General farmland (II) Installed period Continuously used from early June of 2007

(III) Installation effect

The device was installed in a rice-planting season for dislodging deer. They came near the rice paddies for a few times, but never walked into the rice paddies. The device was also used in a farmland for dislodging monkeys. Before installing this device, farmers gave up on planting because monkeys ruined the planting. However, only a little damage was suffered after installing the device. Thus, they could plant seeds throughout this year. Although there was only one trace of appearance about 100 m ahead the farmland, there was no trace that the troop approached the farmland. No foot print of bears was found and no damage by crows was suffered at all.

Experiment 5

(I) Installed place Fukushima prefecture Minamiaizu machi Tateiwa Tanose district (II) Installed period Continuously used from end of August of 2007

(III) Installation effect

A troop of monkeys appeared frequently once or twice a month before installing this device, but they have never appeared after installing this device. The device is being used currently after changing an installing place. Its effect is good.

Experiment 6

(I) Installed place Fukushima prefecture Minamiaizu machi Takinohara area General farmland (II) Installed period One month from early August of 2007

(III) Installation effect

A troop of monkeys appeared at least once a week to cause damage before installing this device. This area has been a pathway of troop of monkeys. After installing this device, bean field at the corner of the farmland suffered a minor damage by a few monkeys on the 20th day after installation. The monkeys were frequently seen near railway about 100 m ahead this device, but never came inside the farmland. Because of the weird sound, they seem to detour cautiously around an area where the sound can be heard. Although the device was removed early September, monkeys have never appeared so far (end of October) because they still seem to hate the area. The pathway of the troop of monkeys seems to have changed. Only one unit was used this time, but even better effect is expected if two units are installed in upper and lower positions (farmland having about 100 m in length× about 50 m in width).

Experiment 7

(I) Installed place Fukushima prefecture Minamiaizu machi Nagano area Orchard (II) Installed period Continuously used from August of 2007

(III) Installation effect

The device is being used against bears. No damage has been caused so far. Although single body of monkey is seen near the farmland, the troop is unknown because it is not seen. In addition, there has been no damage by birds at all. Particularly, crows have never tried to approach the farmland.

Experiment 8

(I) Installed place Fukushima prefecture Minamiaizu machi Tajima-minamishimohara area General farmland (II) Installed period two months from early August to end of October of 2007

(III) Installation effect

After installing this device, a minor damage was caused on the second week. But it is unknown whether or not monkeys caused the damage. No damage was caused after that. Damage is virtually none comparing to before installing this device. In addition, crows that had come to watermelon field have not come any more. They had sat on a power line in a row across from the field, but have never come. It is believed that considerable effect was exerted.

Experiment 9

(I) Installed place Fukushima prefecture Minamiaizu machi Furuuchi area Orchard (II) Installed period Continuously used from early October of 2007

(III) Installation effect

A troop of monkeys frequently appeared last year, and almost no crop was made. The orchard is undefended with no explosion machine or fence, and suffered from damage about twice within a month after installing this device this year, but it remarkably reduced comparing to last year. This device is considered to be definitely effective.

Experiment 10

(I) Installed place Fukushima prefecture Minamiaizu machi Obisawa area Fish farm (II) Installed period Continuously used from early October of 2007

(III) Installation effect

The device is being tested against gray herons and night herons. Before installing this device, they swooped down around a pond after fish. After installing this device, they sit on nearby trees, but there is no trace of swooping down by the pond. Currently, the device is being continuously tested.

What is claimed is:

1. A wildlife dislodging device comprising:
  a first oscillating circuit;
  a counter that counts pulse number of an output signal of said first oscillating circuit;
  a designated value-generating circuit that designates values to be counted by said counter;
  a second oscillating circuit that changes the designated value of said designated value-generating circuit at an interval of predetermined time;
  a comparator circuit that compares the count value of said counter with the designated value of said designated value-generating circuit, and outputs a pulse signal and resets said counter when said count value reaches said designated value;
  an output circuit that amplifies the pulse signal of said comparator circuit;
  sound transforming means for transforming the pulse signal of said output circuit into sound;
  a delay circuit that delays time of transmitting the designated value of said designated value-generating circuit to said comparator circuit; and
  an initial value-changing circuit that changes an initial value of said counter during said delay time.

2. The wildlife dislodging device according to claim 1, wherein
  an oscillation frequency of said second oscillating circuit is lower than an oscillation frequency of said first oscillating circuit.

3. The wildlife dislodging device according to claim 2, wherein the frequency of an output signal of said second oscillating circuit is 100 Hz.

4. The wildlife dislodging device according to claim 1, wherein
  a designated value of said designated-value generating circuit increases stepwise from a first frequency to a second frequency, and the designated value returns to the first frequency after the designated value reaches the second frequency.

5. The wildlife dislodging device according to claim 4, wherein time when a frequency reaches from said first frequency to said second frequency or from said first frequency to said second frequency is set as one unit, and a series of action that an oscillation is stopped for a fixed time after time of predetermined number of units passes is repeated.

6. The wildlife dislodging device according to claim 4, wherein said first frequency is 10 kHz and said second frequency is 50 kHz.

7. The wildlife dislodging device according to claim 1, wherein a designated value of said designated-value generating circuit decreases from a second frequency to a first frequency stepwise, and the value returns to the second frequency when the value reaches the first frequency.

8. The wildlife dislodging device according to claim 7, wherein time when a frequency reaches from said first frequency to said second frequency or from said first frequency to said second frequency is set as one unit, and a series of action that an oscillation is stopped for a fixed time after time of predetermined number of units passes is repeated.

9. The wildlife dislodging device according to claim 7, wherein said first frequency is 10 kHz and said second frequency is 50 kHz.

* * * * *